(12) United States Patent
Yamaguchi et al.

(10) Patent No.: US 8,773,556 B2
(45) Date of Patent: Jul. 8, 2014

(54) SIGNAL PROCESSING DEVICE, IMAGING DEVICE, AND SIGNAL PROCESSING METHOD FOR COLOR INTERPOLATION

(75) Inventors: Yuya Yamaguchi, Kanagawa (JP); Manabu Kawashima, Tokyo (JP)

(73) Assignee: Sony Corporation, Tokyo (JP)

( * ) Notice: Subject to any disclaimer, the term of this patent is extended or adjusted under 35 U.S.C. 154(b) by 363 days.

(21) Appl. No.: 12/855,227

(22) Filed: Aug. 12, 2010

(65) Prior Publication Data

US 2011/0043671 A1 Feb. 24, 2011

(30) Foreign Application Priority Data

Aug. 18, 2009 (JP) ................. 2009-189419

(51) Int. Cl.
*H04N 9/083* (2006.01)
*H04N 3/14* (2006.01)
*H04N 5/335* (2011.01)
*H04N 9/04* (2006.01)

(52) U.S. Cl.
USPC ........ 348/280; 348/222.1; 348/272; 382/160; 382/260; 382/300

(58) Field of Classification Search
USPC ........ 348/280, 222.1, 272; 382/160, 260, 300
See application file for complete search history.

(56) References Cited

U.S. PATENT DOCUMENTS

| 4,642,678 A | 2/1987 | Cok |
| 5,629,734 A | 5/1997 | Hamilton, Jr. et al. |
| 2006/0133697 A1 | 6/2006 | Uvarov et al. |
| 2009/0160992 A1* | 6/2009 | Inaba et al. ................... 348/308 |

FOREIGN PATENT DOCUMENTS

| JP | 2002 27487 | 1/2002 |
| JP | 2005 217478 | 8/2005 |
| JP | 2006 174485 | 6/2006 |

OTHER PUBLICATIONS

Hung-An Chang et al. "Directionally Weighted Color Interpolation for Digital Cameras", Circuits and Systems, 2005. ISCAS 2005. IEEE International Symposium on May 23-26, 2005 pp. 6284-6287 vol. 6.
Ron Kimmel, "Demosaicing: Image Reconstruction from Color CCD Samples", IEEE Trans. Image Processing, vol. 8, pp. 1221-1228, 1999.

* cited by examiner

*Primary Examiner* — Antoinette Spinks
(74) *Attorney, Agent, or Firm* — Frommer Lawrence & Haug LLP; William S. Frommer; Ellen Marcie Emas

(57) ABSTRACT

A signal processing device includes a preprocessing unit interpolating a G color component to positions of a pixel of interest and a pixel having the same color component as the pixel of interest so as to produce a first G interpolation signal; a proximity G pixel G color difference and R/B pixel producing unit producing a first R-G/B-G color difference signal on the positions of the pixel of interest and the pixel having the same color component, producing a second R-G/B-G color difference signal on a position of a proximity G pixel, and interpolating the R/B color component to the position of the proximity G pixel; a G color difference re-constitution processing unit re-constituting a third R-G/B-G color difference signal on the position of the pixel of interest; and a G color difference interpolation processing unit interpolating an R-G/B-G color difference signal to a position of a predetermined pixel.

7 Claims, 13 Drawing Sheets

FIG. 3A

| B22 | Gb23 | B24 |
|---|---|---|
| Gr32 | R33 | Gr34 |
| B42 | Gb43 | B44 |

FIG. 3B

| U'22 |  | U'24 |
|---|---|---|
|  | V'33 |  |
| U'42 |  | U'44 |

FIG. 3C

|  | B23 |  |
|---|---|---|
| R32 | Gr33 | R34 |
|  | B43 |  |

FIG. 3D

|  | U'23 |  |
|---|---|---|
| V'32 |  | V'34 |
|  | U'43 |  |

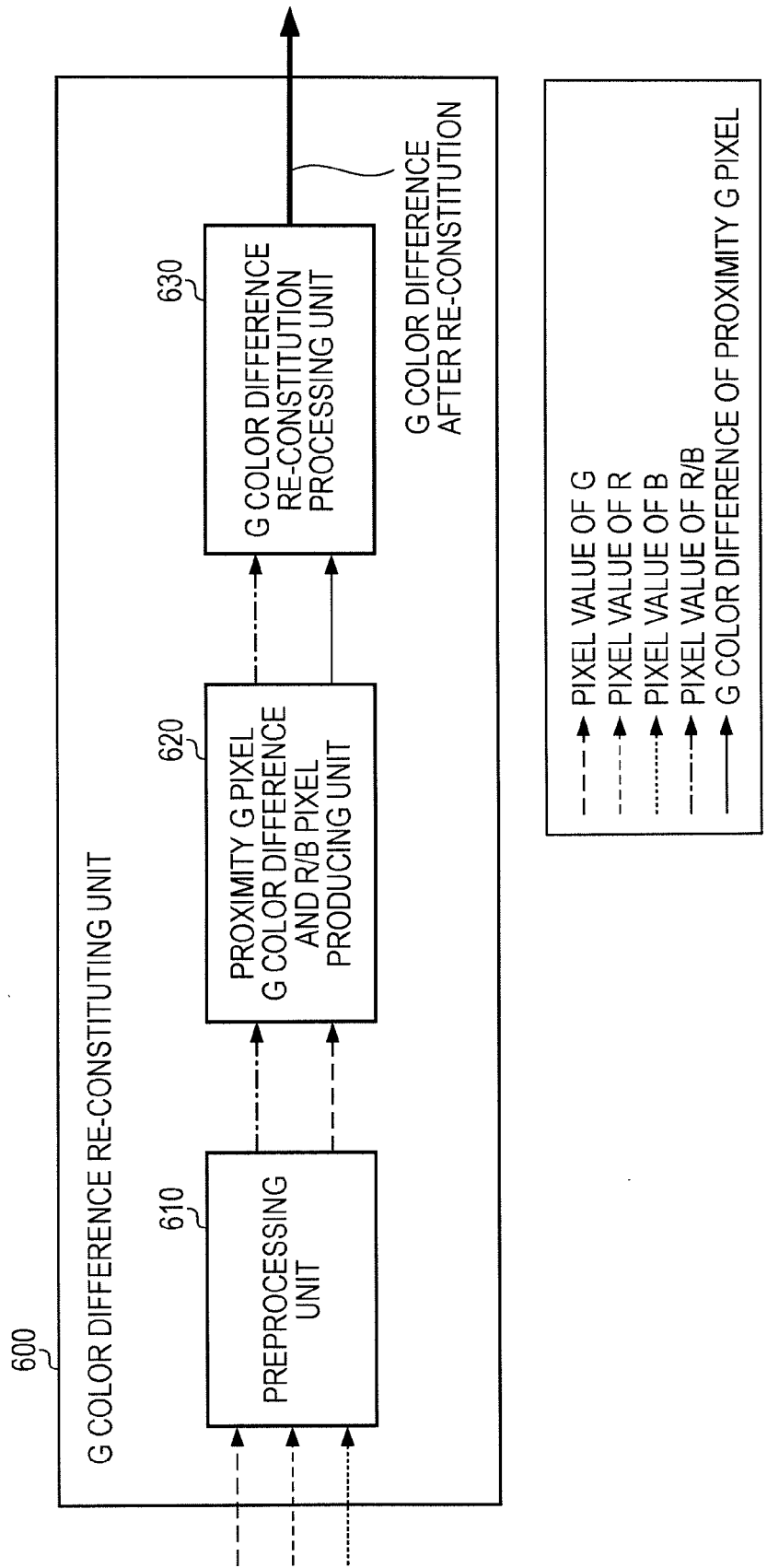

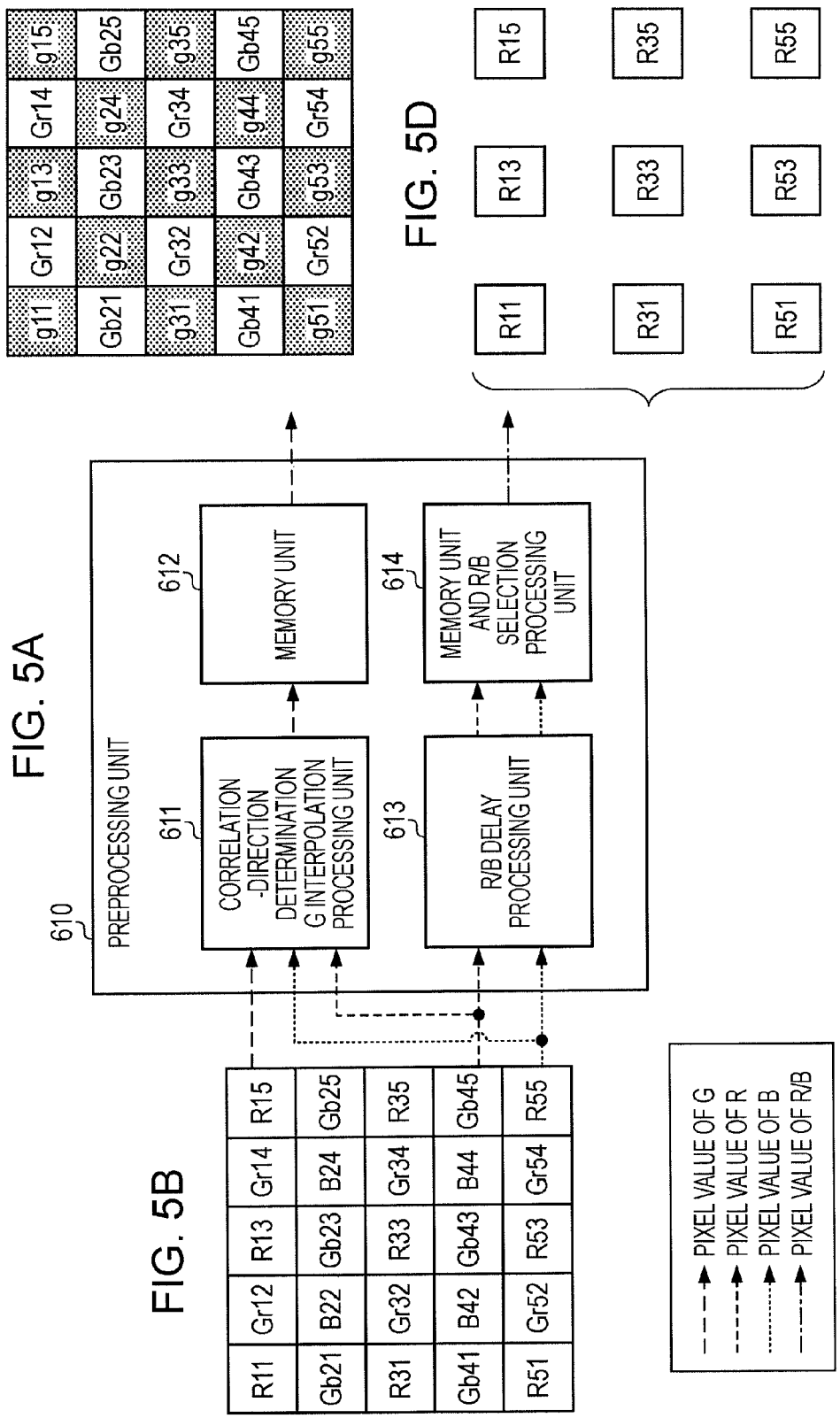

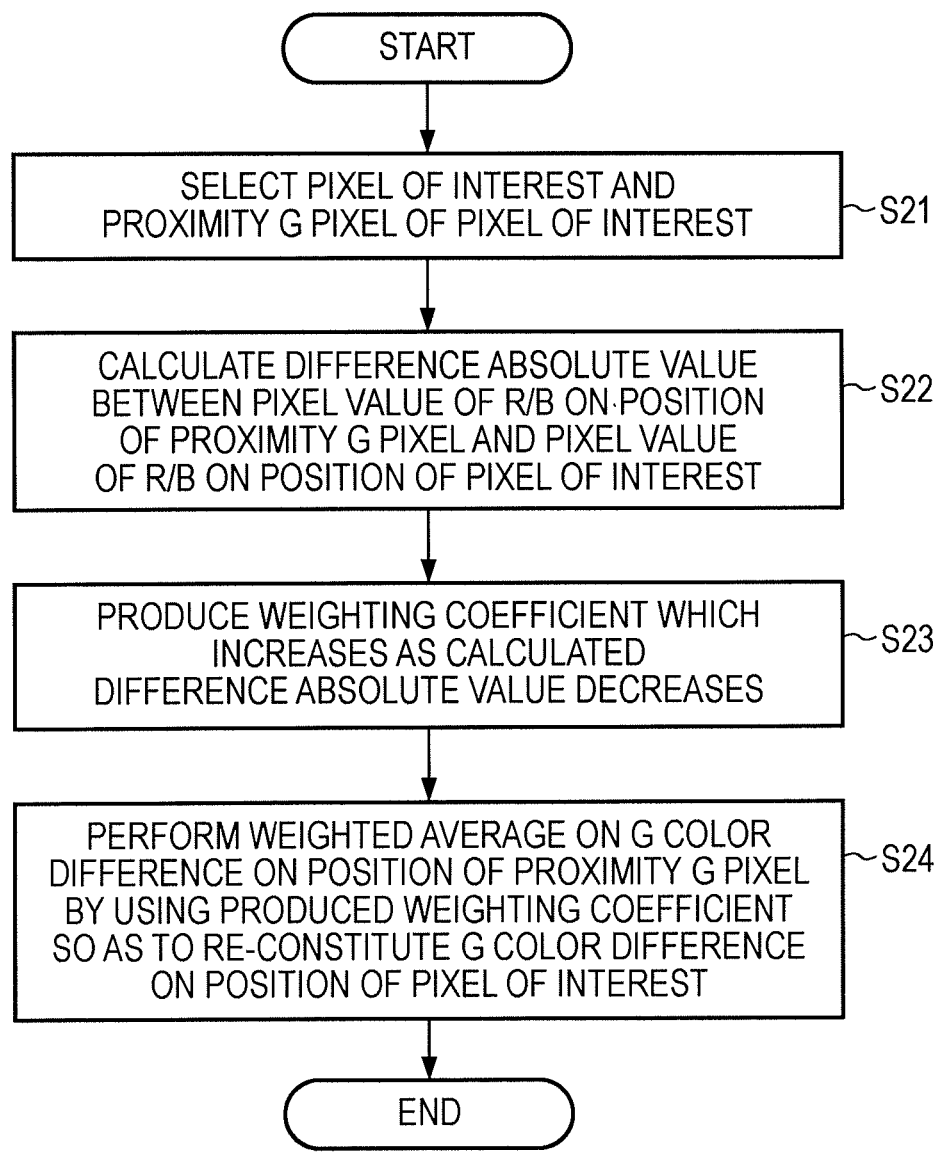

| R11 | Gr12 | R13 | Gr14 | R15 |
|-----|------|-----|------|-----|
| Gb21 | B22 | Gb23 | B24 | Gb25 |
| R31 | Gr32 | R33 | Gr34 | R35 |
| Gb41 | B42 | Gb43 | B44 | Gb45 |
| R51 | Gr52 | R53 | Gr54 | R55 |

SIGNAL PROCESSING DEVICE, IMAGING DEVICE, AND SIGNAL PROCESSING METHOD FOR COLOR INTERPOLATION

BACKGROUND OF THE INVENTION

1. Field of the Invention

The present invention relates to a signal processing device, an imaging device, and a signal processing method. In particular, the present invention relates to a technique of interpolating color information to each pixel signal obtained through a color filter array, for example.

2. Description of the Related Art

In a single-plate type imaging device, a color filter array is used so as to separate object light obtained through a lens into three primary colors of R (red), G (green), and B (blue). A Bayer array is commonly used as the color filter array. An example of the Bayer array is illustrated in FIG. 13. In the Bayer array, G pixels to which a luminance signal contributes at a high rate are arranged checkerwise and R pixels and B pixels are respectively arranged checkerwise in the rest part of the array.

Since each pixel can obtain data of only one color among R, G, and B, data of other colors, which are not obtained, are obtained by performing an interpolation calculation using outputs of surrounding pixels. In a case of a position of R33 in FIG. 13, missing G component and B component are interpolated by the calculation.

As a method of the interpolation, such method is disclosed that, among pixels positioned in proximity to a pixel of interpolation object (also referred to below as a pixel of interest), interpolation is performed by using only a pixel in a direction in which the pixel is estimated to have strong correlation with the pixel of interest (for example, refer to J. F. Hamilton and J. E. Adams: "Adaptive color plane interpolation in single sensor color electronic camera," U.S. Pat. No. 5,629,734). In this method, an amount of change in a pixel value of each of pixels, which are positioned in proximity to the pixel of interest, as compared to a pixel value of the pixel of interest is often used as a barometer representing strength of correlation. Accordingly, the interpolation is performed in such a manner that a direction in which an amount of change in a pixel value is small is considered as a direction of high correlation.

The amount of change in a pixel value is often estimated based on an amount of change in a pixel value of G. This is because G pixels have more amount of information than R pixels and B pixels due to the Bayer array in which G pixels are arranged in the largest number. That is, accuracy in determination of the strong-correlation direction can be improved by determining a strong-correlation direction based on the amount of change in a pixel value of G.

However, in a case where the pixel of interest is positioned on a corner or a texture part of an image, a direction in which pixels having strong correlation with the pixel of interest are positioned (referred to below as a correlation direction) may not be correctly estimated by determination based on the amount of change in a pixel value of G. This is because there are a plurality of directions in which the amount of change in a pixel value of G is high, at a corner or a texture part.

D. Cok: "Signal Processing Method and Apparatus for Producing Interpolated Chrominance Values In a Sampled Color Image Signal," U.S. Pat. No. 4,642,678, 1987, for example, discloses a method which uses not only a spatial correlation of a specific primary color (G, for example) but also a correlation between primary colors. This method is based on a hypothesis: "a color component does not suddenly change in a local region" (constant hue hypothesis). Namely, it is assumed that an amount of change in R (or B) (referred to below as R/B) and an amount of change in G (a ratio of R/B and a ratio of G (referred to below as a color ratio)) are nearly equal to each other due to a correlation between different primary colors. Based on this assumption, a color ratio of each of pixels surrounding around the pixel of interest is produced and a color ratio of the pixel of interest is estimated from the color ratio of the surrounding pixels so as to estimate an interpolation value of the pixel of interest.

Further, such a method is disclosed that a color component of surrounding pixels which is estimated to have high correlation is largely weighted depending on an amount of change in a pixel value of G and an amount of change in a pixel value of the pixel of interest (R or B) so as to estimate a color component of the pixel of interest (For example, refer to H A. Chang and H. Chen: "Directionally Weighted Color Interpolation for Digital Cameras," Circuits and Systems, 2005. ISCAS 2005. IEEE International Symposium on 23-26 May 2005, Page(s): 6284-6287 Vol. 6, and Japanese Unexamined Patent Application Publication No. 2006-174485). According to this method, color interpolation can be performed while suppressing an unnatural artifact (false color) even in an edge in which a color suddenly changes.

However, in the above-described method, detection may be less-accurately performed by using amounts of change in pixel values of pixels of a single color and estimation is performed by using less-accurate color components of surrounding pixels. Accordingly, in a texture part having a high frequency and the like, accuracy in estimating a color component of a pixel of interest is disadvantageously degraded when surrounding pixel values are not produced (interpolated) based on a correct estimation.

Therefore, such a method is disclosed that correlation-direction detection is repeated after such color interpolation processing, thus improving accuracy in estimating a color component of surrounding pixels of the pixel of interest, and detecting a correlation direction with higher accuracy so as to re-constitute a color interpolation image (for example, refer to R. Kimmel, "Demosaicing: Image reconstruction from CCD samples, "IEEE Trans. Image Processing, vol. 8, pp. 1221-1228, 1999).

SUMMARY OF THE INVENTION

However, the data amount and calculation amount are greatly increased in the method disclosed in R. Kimmel, "Demosaicing: Image reconstruction from CCD samples, "IEEE Trans. Image Processing, vol. 8, pp. 1221-1228, 1999, because correlation-direction detection is repeated with respect to a color interpolation image produced by color interpolation. Further, a correlation direction is detected by using an image after color interpolation. Therefore, the correlation direction is not correctly determined when a difference between a pixel value obtained by the color interpolation and a pixel value of an original image is extensive. That is, accuracy in the color interpolation is not improved disadvantageously in such case.

It is desirable to provide a signal processing device, an imaging device, and a signal processing method in which color interpolation can be accurately performed without increasing the data amount and calculation amount even in an edge part and the like of an image.

In an embodiment of the present invention, a pixel value (color component) missing in a pixel signal is interpolated. The pixel signal is obtained by an imaging element including a plurality of pixels that are two-dimensionally arranged on which color filters of primary colors of R, G, and B are alternately arranged in a predetermined array. That is, a signal processing device according to the embodiment of the present invention includes a preprocessing unit, a proximity G pixel G color difference and R/B pixel producing unit, a G color difference re-constitution processing unit, a G color difference interpolation processing unit, and an RGB producing unit.

The preprocessing unit interpolates a G color component on a position of a pixel of interest, which has one of an R color component and a B color component and is on a predetermined pixel position, and on a position of a pixel having the same color component as the pixel of interest so as to produce a first G interpolation signal. The proximity G pixel G color difference and R/B pixel producing unit first produces one of a first R-G color difference signal and a first B-G color difference signal on the position of the pixel of interest and on the position of the pixel having the same color component as the pixel of interest by using the first G interpolation signal. Then, the proximity G pixel G color difference and R/B pixel producing unit produces one of a second R-G color difference signal and a second B-G color difference signal on a position of a proximity G pixel that is positioned in proximity to the pixel of interest by using one of the first R-G color difference signal and the B-G color difference signal. Further, the proximity G pixel G color difference and R/B pixel producing unit interpolates one of the R color component and the B color component on the position of the proximity G pixel by using one of the second R-G color difference signal and the second B-G color difference signal.

The G color difference re-constitution processing unit re-constitutes one of a third R-G color difference signal and a third B-G color difference signal on the position of the pixel of interest by using one of the R component and the B component that are interpolated by the proximity G pixel G color difference and R/B pixel producing unit.

The G color difference interpolation processing unit interpolates one of an R-G color difference signal and a B-G color difference signal on a position of a predetermined pixel by using one of the third R-G color difference signal and the third B-G color difference signal that are re-constituted by the G color difference re-constitution processing unit.

According to the above structure, a G color difference signal formed by combining a plurality of G color difference signals (R-G color difference signals or B-G color difference signals) is produced around the pixel of interest, and a G color difference on the position of the predetermined pixel is re-constituted based on the produced G color difference signal.

According to "constant hue hypothesis" mentioned above, even when accuracy of a produced G color difference signal is insufficient, a more reliable G color difference signal can be obtained by collecting and averaging a plurality of G color difference signals. Thus, the above structure enables color interpolation to be accurately performed even in an edge part and the like in which accuracy of a G color difference signal is easily degraded.

BRIEF DESCRIPTION OF THE DRAWINGS

FIGS. 3A to 3D illustrate an example of an array of pixels inputted into a G color difference interpolation processing unit of the embodiment of the present invention, FIG. 3A illustrates an example of an array of a case where a pixel of interest is R, FIG. 3B illustrates an example of an array of G color differences used in the case where the pixel of interest is R, FIG. 3C illustrates an example of an array of a case where the pixel of interest is Gr, and FIG. 3D illustrates an array of G color differences used in the case where the pixel of interest is Gr;

FIG. 4 is a block diagram showing an example of an internal structure of a G color difference re-constituting unit according to the embodiment of the present invention;

FIGS. 5A to 5D are block diagrams showing an example of an internal structure of a preprocessing unit according to the embodiment of the present invention;

FIG. 11 is a flowchart showing an example of processing of the G color difference re-constitution processing unit according to the embodiment of the present invention;

FIGS. 12A to 12C are explanatory diagrams showing arrays of color filters of other examples according to the embodiment of the present invention, FIG. 12A illustrates an example of a honeycomb array, FIG. 12B illustrates an example of a pixel array in a ClearVid CMOS Sensor, and FIG. 12C illustrates an application of a pixel array in the ClearVid CMOS Sensor; and FIG. 13 is an explanatory diagram showing an example of a structure of a Bayer array of related art.

DESCRIPTION OF THE PREFERRED EMBODIMENTS

A signal processing device, an imaging device, and a video signal processing method according to an embodiment of the present invention will now be described with reference to the accompanying drawings in the following order.

Figure 1:
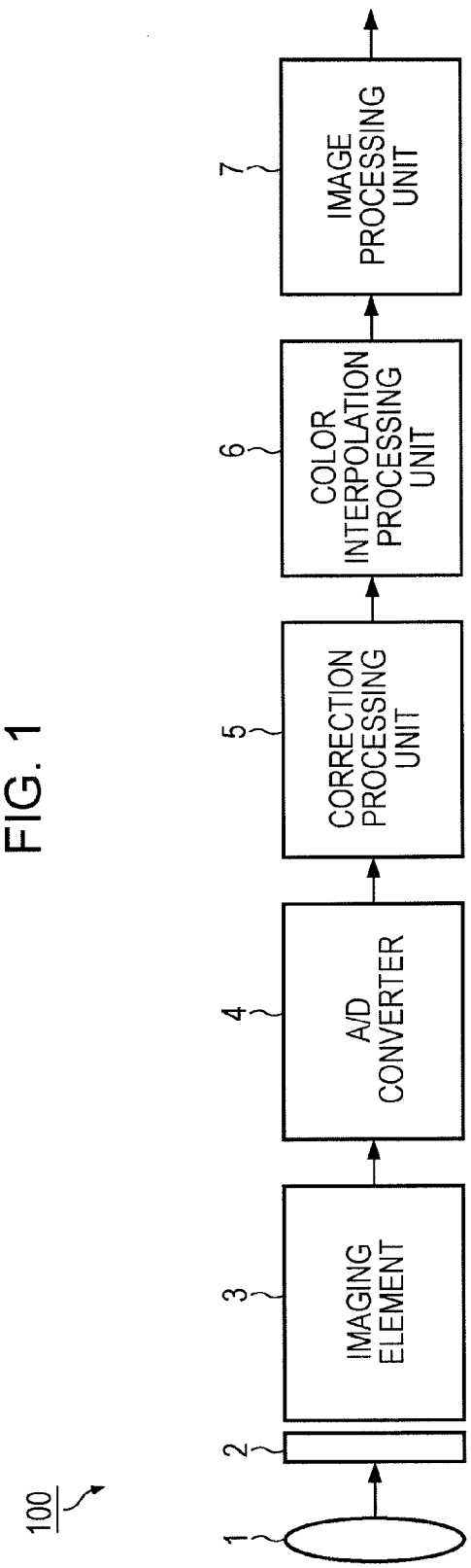
FIG. 1 is a block diagram showing an example of an internal structure of an imaging device according to an embodiment of the present invention.

1. Structural Example of Imaging Device
2. Structural Example of Color Interpolation Processing Unit
3. Structural Example of G Color Difference Re-constituting Unit
4. Operation Example of G Color Difference Re-constituting Unit
1. Structural Example of Imaging Device In the embodiment of the present invention, a case where a signal processing device according to the embodiment of the present invention is applied to an imaging device such as a camera will be described as an example. FIG. 1 illustrates an example of the structure inside a camera block of an imaging device 100 according to the embodiment. The camera block shown in FIG. 1 includes a lens 1, a color filter 2, an imaging element 3, an analog-digital converting unit 4 (referred to below as an A/D converter), a correction processing unit 5, a color interpolation processing unit 6, and an image processing unit 7.

The lens 1 forms an image of an object on an imaging surface (not shown) of the imaging element 3. The imaging element 3 is a charge coupled devices (CCD) image sensor or a complementary metal oxide semiconductor (CMOS) image sensor, and is composed of a plurality of photoelectric conversion elements which are two-dimensionally arranged. Each of the photoelectric conversion elements constitutes a pixel and a position of each of the photoelectric conversion elements on the imaging surface corresponds to a pixel position.

The color filter 2 is disposed on the two-dimensionally arranged pixels of the imaging element 3, and the imaging element 3 receives a signal value of one color per one pixel through the color filter 2. The color filter 2 has a Bayer array as an array shown in FIG. 13, and the filter is assumed to be five pixels high and five pixels wide, for example. The height and the width of the filter respectively correspond to a vertical direction and a horizontal direction of the imaging surface.

The A/D converter 4 converts a signal outputted from the imaging element 3 into a digital signal so as to output the digital signal to the correction processing unit 5. The correction processing unit 5 performs correction processing such as shading correction in which luminance unevenness caused by characteristics of an optical system and an imaging system is corrected and pixel defect correction in which a pixel defect caused by a defect of the imaging element 3 and the like is corrected.

The color interpolation processing unit 6 performs an interpolation with respect to a signal of each color corrected at the correction processing unit 5. The color interpolation processing unit 6 will be described in detail later. The image processing unit 7 performs gamma correction, a contour enhancement, and the like with respect to a signal outputted from the color interpolation processing unit 6.

2. Structural Example of Color Interpolation Processing Unit

A structural example of the color interpolation processing unit 6 of the embodiment will now be described. The color interpolation processing unit 6 of the embodiment performs the following processing.

(1) Interpolating a G pixel value (a first G interpolation signal) to a position of a pixel having no G pixel value (an R/B pixel; including a pixel of interest).

(2) Calculating a difference between the interpolated G pixel value (also referred to below as an interpolation value) and a pixel value of the R/B pixel so as to produce a G color difference (a first R-G/B-G color difference signal) on the position of the pixel having no G pixel value.

(3) Producing a G color difference (a second R-G/B-G color difference signal) in a G pixel so as to produce a pixel value of an R/B pixel in the G pixel.

(4) Re-constituting a G color difference (a third R-G/B-G color difference signal) of the pixel of interest by using the pixel value of the R/B pixel produced in the G pixel.

(5) Interpolating a G color difference of a pixel having no R/B pixel value by using the G color difference which is re-constituted.

(6) Calculating a G color difference and spatially interpolating the G color difference so as to obtain pixel values of R, G, and B by using a G pixel value and a G color difference of a G pixel which is to be interpolated or obtain pixel values of R, G, and B by the R/B pixel value and the G color difference.

Figure 2:
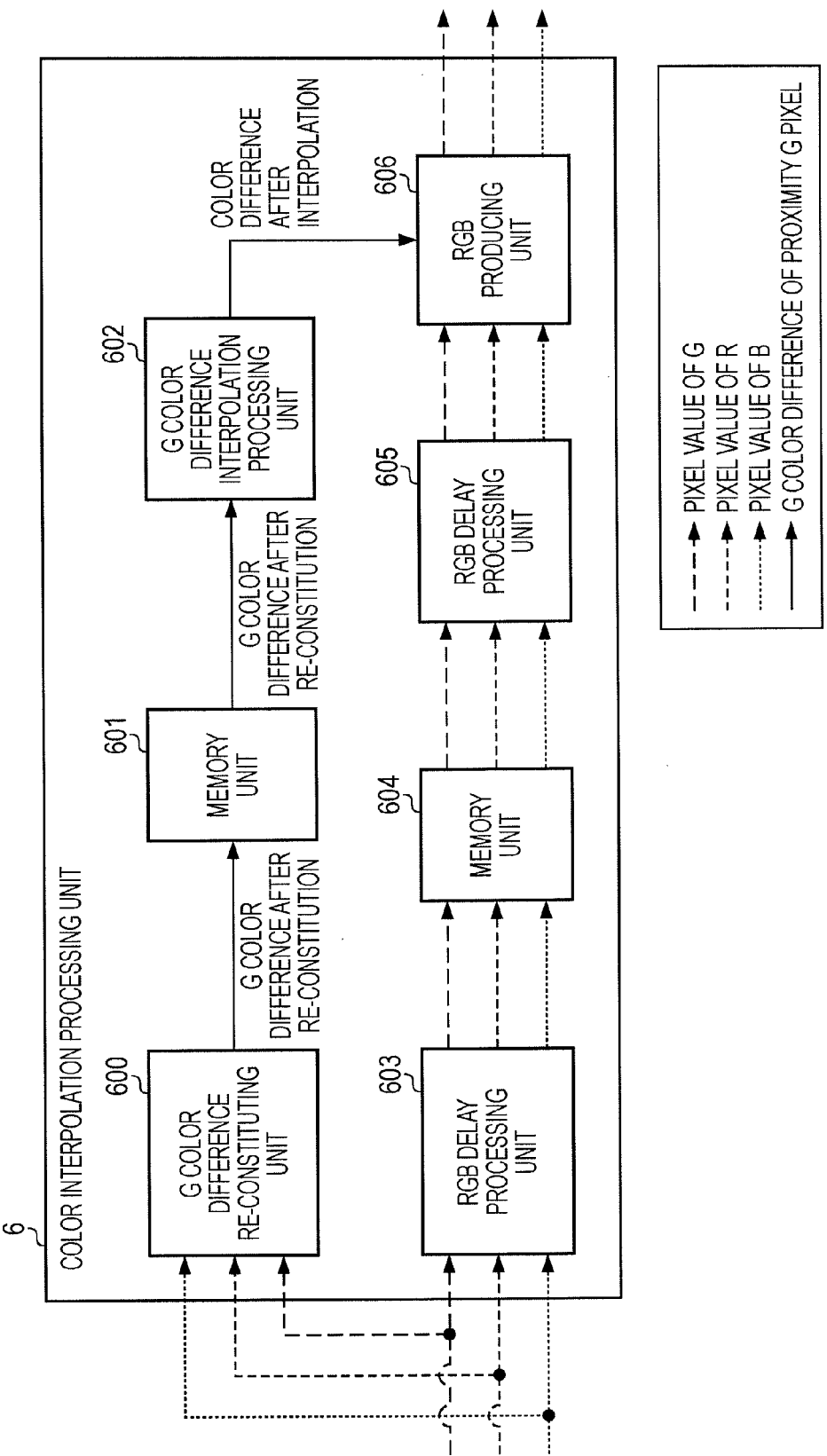
FIG. 2 is a block diagram showing an example of an internal structure of a color interpolation processing unit according to the embodiment of the present invention.

FIG. 2 is a block diagram showing a structural example of the color interpolation processing unit 6. The color interpolation processing unit 6 includes a G color difference re-constituting unit 600, a memory unit 601, and a G color difference interpolation processing unit 602 performing the processing (5) mentioned above. The color interpolation processing unit 6 further includes an RGB delay processing unit 603, a memory unit 604, an RGB delay processing unit 605, and an RGB producing unit 606 that perform the processing (6) mentioned above.

The G color difference re-constituting unit 600 performs the processing (1) to (4) mentioned above. Details of the processing will be described later with reference to FIG. 4 and subsequent drawings. However, through the processing (1) to (4) performed by the G color difference re-constituting unit 600, a G color difference V (R-G) is outputted when the pixel of interest is R, and a G color difference U (B-G) is outputted when the pixel of interest is B.

The memory unit 601 is composed of a plurality of line memories, for example. The memory unit 601 temporarily stores the G color difference outputted from the G color difference re-constituting unit 600 and outputs the G color difference at predetermined timing. The G color difference interpolation processing unit 602 receives the G color difference outputted from the memory unit 601 and performs a processing of interpolating the G color difference of a pixel having no R/B pixel value so as to output the interpolated color difference to the RGB producing unit 606.

FIG. 3A illustrates an example of a pixel array of a case where a pixel of interest is R33. In the array shown in FIG. 3A, a pixel kind and a pixel location are denoted as Xij. A pixel kind (R, Gr or Gb, or B) is assigned to X, a position of a pixel in a vertical direction is assigned to i, and a position of a pixel in a horizontal direction is assigned to j. Gr represents G existing on a line on which R pixels are aligned, and Gb represents G existing on a line on which B pixels are aligned. In the description below, the reference characters such as R33 are used not only for representing a pixel position but also representing a pixel value.

FIG. 3B illustrates an example of each G color difference outputted from the memory unit 601 in the case where the pixel of interest is R33. In this case, a G color difference V33 and a G color difference U33 of the pixel of interest are calculated by using the following expressions, for example.

$V33 = G$ color difference re-constituted at the $G$ color difference re-constituting unit 600 (referred to below as a $G$ color difference $V'33$)

$U33 = (G$ color difference $U22' + U'24 + U'42 + U'44$ re-constituted at the $G$ color difference re-constituting unit 600$)/4$ In a case where the pixel of interest is B as well, the G color difference U and the G color difference V are calculated in a similar manner.

FIG. 3C illustrates an example of a pixel array in a case where the pixel of interest is Gr33. In this case, the G color difference V33 and the G color difference U33 of the pixel of interest are calculated by using the following expressions, for example.

$V33 = (V32' + V34')/2$ $U33 = (U32' + U43')/2$

In a case where the pixel of interest is Gb as well, the G color difference U and the G color difference V are calculated in a similar manner. Here, a calculating method of the G color difference is not limited to this method, but the G color difference may be calculated in other method.

Referring back to FIG. 2, the RGB producing unit 606 performs the processing (6) mentioned above. That is, the RGB producing unit 606 produces a pixel value of each of R, G, and B by using each G color difference outputted from the G color difference interpolation processing unit 602 and a pixel value of each of R, G, and B outputted from the RGB delay processing unit 605. For example, in a case where the pixel of interest is R as shown in FIG. 3A, a pixel value of each of R, G, and B is produced by using the following expressions.

$R=R33$ $G=R33-V33$ $B=U33+G33$

In a case where the pixel of interest is B as well, a pixel value of each of R, G, and B is calculated in a similar manner.

In a case where the pixel of interest is Gr as shown in FIG. 3C, a pixel value of each of R, G, and B is produced by using the following expressions.

$R=V33+Gr33$ $G=Gr33$ $B=U33+Gr33$

In a case where the pixel of interest is Gb as well, a pixel value of each of R, G, and B is calculated in a similar manner.

The RGB delay processing unit 603 delays an output of a pixel value of each of R, G, and B so as to match timing of supplying the pixel value of each of R, G, and B to the memory unit 604 with timing of supplying a G color difference from the G color difference re-constituting unit 600 to the memory unit 601.

The memory unit 604 temporarily stores the pixel value of each of R, G, and B outputted from the RGB delay processing unit 603 and outputs the pixel value to the RGB delay processing unit 605. The RGB delay processing unit 605 delays an output of the pixel value of each of R, G, and B so as to match timing of supplying the pixel value of each of R, G, and B to the RGB producing unit 606 with timing of supplying a G color difference from the G color difference interpolation processing unit 602 to the RGB producing unit 606.

3. Structural Example of G Color Difference Re-constituting Unit

The G color difference re-constituting unit 600 will now be described in detail with reference to FIG. 4. FIG. 4 is a block diagram showing a structural example of the G color difference re-constituting unit 600. The G color difference re-constituting unit 600 includes a preprocessing unit 610, a proximity G pixel G color difference and R/B pixel producing unit 620, and G color difference re-constitution processing unit 630.

The preprocessing unit 610 performs the processing (1) mentioned above. That is, the preprocessing unit 610 interpolates a G pixel value to a pixel having no G pixel value (including a pixel of interest) by using a pixel signal of each of R, G, and B, which is obtained by each pixel of the imaging element 3 through the color filter 2, as an input. Then the preprocessing unit 610 outputs a G pixel value obtained by the imaging element 3 and the G pixel value produced by the interpolation (also referred to below as an interpolation value). Further, the preprocessing unit 610 delays an R/B pixel signal received from the imaging element 3 and temporarily stores the R/B pixel signal so as to match phases of a G pixel signal and the R/B pixel signal.

The proximity G pixel G color difference and R/B pixel producing unit 620 performs the processing (2) to (4) mentioned above. That is, the proximity G pixel G color difference and R/B pixel producing unit 620 produces a G color difference in a plurality of G pixels positioned in proximity to the pixel of interest (referred to below as proximity G pixels) by using the R/B pixel value and the G pixel value outputted from the preprocessing unit 610. Further, the proximity G pixel G color difference and R/B pixel producing unit 620 produces an R/B pixel value in the proximity G pixels by using the produced G color difference and the G interpolation value received from the preprocessing unit 610.

The G color difference re-constitution processing unit 630 performs the processing (5) mentioned above. That is, the G color difference re-constitution processing unit 630 re-constitutes a G color difference of the pixel of interest by using the R/B pixel value, which is produced by the proximity G pixel G color difference and R/B pixel producing unit 620, of the proximity G pixel. At this time, in the G color difference re-constitution of the pixel of interest, the G color difference re-constitution processing unit 630 weights a pixel value of a pixel positioned in a direction in which an amount of change in a G pixel value is smaller.

Structural Example of Each Block Inside Color Interpolation Processing Unit

Each block constituting the color interpolation processing unit 6 mentioned above will now be described in detail with reference to FIGS. 5A to 8.

FIG. 5A is a block diagram showing a structural example of the preprocessing unit 610. The preprocessing unit 610 includes a correlation-direction determination G interpolation processing unit 611, a memory unit 612, an R/B delay processing unit 613, and a memory unit and R/B selection processing unit 614.

The description below is based on an assumption of a case where each pixel value of an array shown in FIG. 5B is inputted into the preprocessing unit 610. That is, a case where each pixel value of a 5×5 pixel array around R33 is inputted is described as an example. Here, a similar processing is performed in a case where the pixel of interest is a B pixel, as well.

When an inputted pixel has a G pixel value, the correlation-direction determination G interpolation processing unit 611 in the preprocessing unit 610 outputs the G pixel value as it is to the memory unit 612. On the other hand, when the inputted pixel does not have a G pixel value, the correlation-direction determination G interpolation processing unit 611 interpolates a G pixel value and outputs the interpolation value to the memory unit 612. The interpolation of a G pixel value is performed by using a pixel value of a pixel positioned in a direction of high correlation with the pixel of interest.

The interpolation of a G pixel value is performed by using the following expressions, for example. The following expressions represent processing in a case where each of pixels arranged as shown in FIG. 5B is inputted. In FIG. 5B, i denotes a coordinate in a vertical direction of the pixel of interest, and j denotes a coordinate in a horizontal direction. Further, kinds of pixels are denoted by R, G, and B. In the following expressions, "DH" denotes a change amount between each pixel adjacent to a pixel of interest $R_{ij}$ in the horizontal direction and the pixel of interest $R_{ij}$, "DV" denotes a change amount between each pixel adjacent to the pixel of interest $R_{ij}$ in the vertical direction and the pixel of interest $R_{ij}$, and $g_{ij}$ denotes a interpolation value of G.

First, a change amount DH in the horizontal direction and a change amount DV in the vertical direction are calculated respectively by using Expression 1 and Expression 2 below.

$$DH=|-R_{i,j-2}+2R_{i,j}-R_{i,j+2}|+|G_{i,j-1}-G_{i,j+1}| \quad (1)$$

$$DV=|-R_{i-2,j}+2R_{i,j}-R_{i+2,j}|+|G_{i-1,j}-G_{i+1,j}| \quad (2)$$

Subsequently, an interpolation value $g_{ij}$ is calculated by using the following expressions.
if DH<DV, $$g_{i,j} = \frac{G_{i,j-1} + G_{i,j+1}}{2} + \frac{-R_{i,j-2} + 2R_{i,j} - R_{i,j+2}}{2}$$

if DH>DV, $$g_{i,j} = \frac{G_{i-1,j} + G_{i+1,j}}{2} + \frac{-R_{i-1,j} + 2R_{i,j} - R_{i+2,j}}{2}$$

if DH=DV, $$g_{i,j} = \frac{G_{i-1,j} + G_{i,j-1} + G_{i,j+1} + G_{i+1,j}}{2} + \frac{-R_{i-2,j} - R_{i,j-2} + 4R_{i,j} - R_{i,j+2} - R_{i+2,j}}{2}$$

Here, the above expressions represent an example of calculation of an interpolation value, and the calculation of an interpolation value is not limited to the above method. For example, such method may be employed that amounts of change in G pixel values in four direction of the left, right, top, and bottom of the pixel of interest are calculated by using only the G pixel values, and a weighted average of a pixel value of a G pixel positioned in a direction which is determined as a high-correlation direction is used as an interpolation value. Thus other methods may be employed. Though any interpolation methods are applicable, a method by which a correlation direction can be more precisely determined is more desirable.

Referring back to FIG. 5A, the memory unit 612 is composed of a plurality of line memories (five line memories in the embodiment) corresponding to the number of lines of the color filter 2 (refer to FIG. 1), for example. The memory unit 612 stores each pixel value outputted from the correlation-direction determination G interpolation processing unit 611 and outputs the pixel value at predetermined timing. FIG. 5C illustrates an example of an array of pixels outputted from the memory unit 612. Pixels obtained by the interpolation processing of the correlation-direction determination G interpolation processing unit 611 are shown with a tinted color and a kind of a color component is denoted by a small letter as "g33".

The R/B delay processing unit 613 delays each inputted pixel value of R/B by an amount of processing time of the correlation-direction determination G interpolation processing unit 611 and supplies the each delayed pixel value of R/B to the memory unit and R/B selection processing unit 614.

The memory unit and R/B selection processing unit 614 temporarily stores the each pixel value of R/B delayed at the R/B delay processing unit 613. Then the memory unit and R/B selection processing unit 614 selects an R/B pixel to be used for processing at the proximity G pixel G color difference and R/B pixel producing unit 620 (refer to FIG. 4) on a subsequent stage among the R/B pixel values stored therein and outputs the selected R/B pixel to the proximity G pixel G color difference and R/B pixel producing unit 620 (refer to FIG. 5D).

Figure 6:
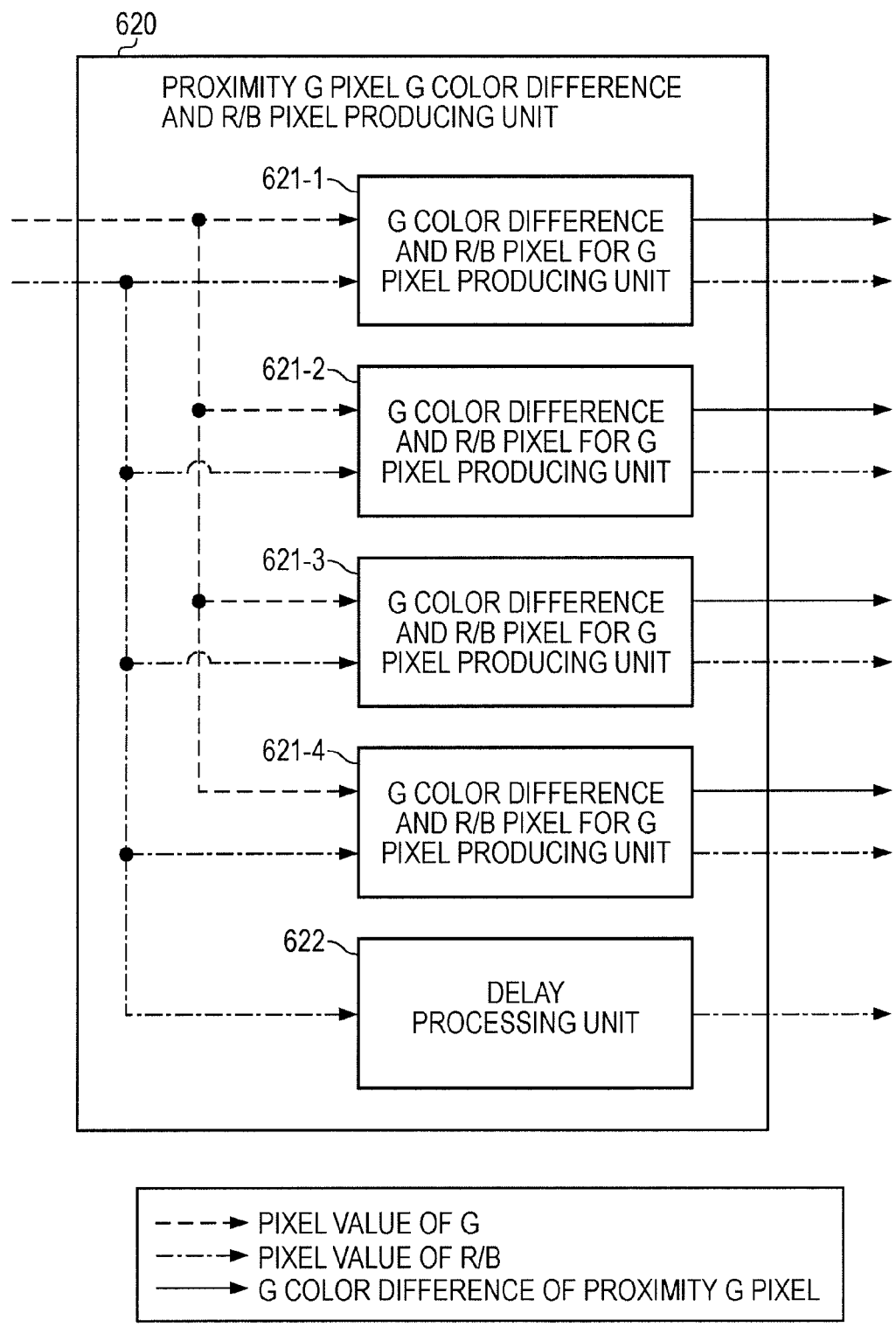
FIG. 6 is a block diagram showing an example of an internal structure of a proximity G pixel G color difference and R/B pixel producing unit according to the embodiment of the present invention.
Figure 7:
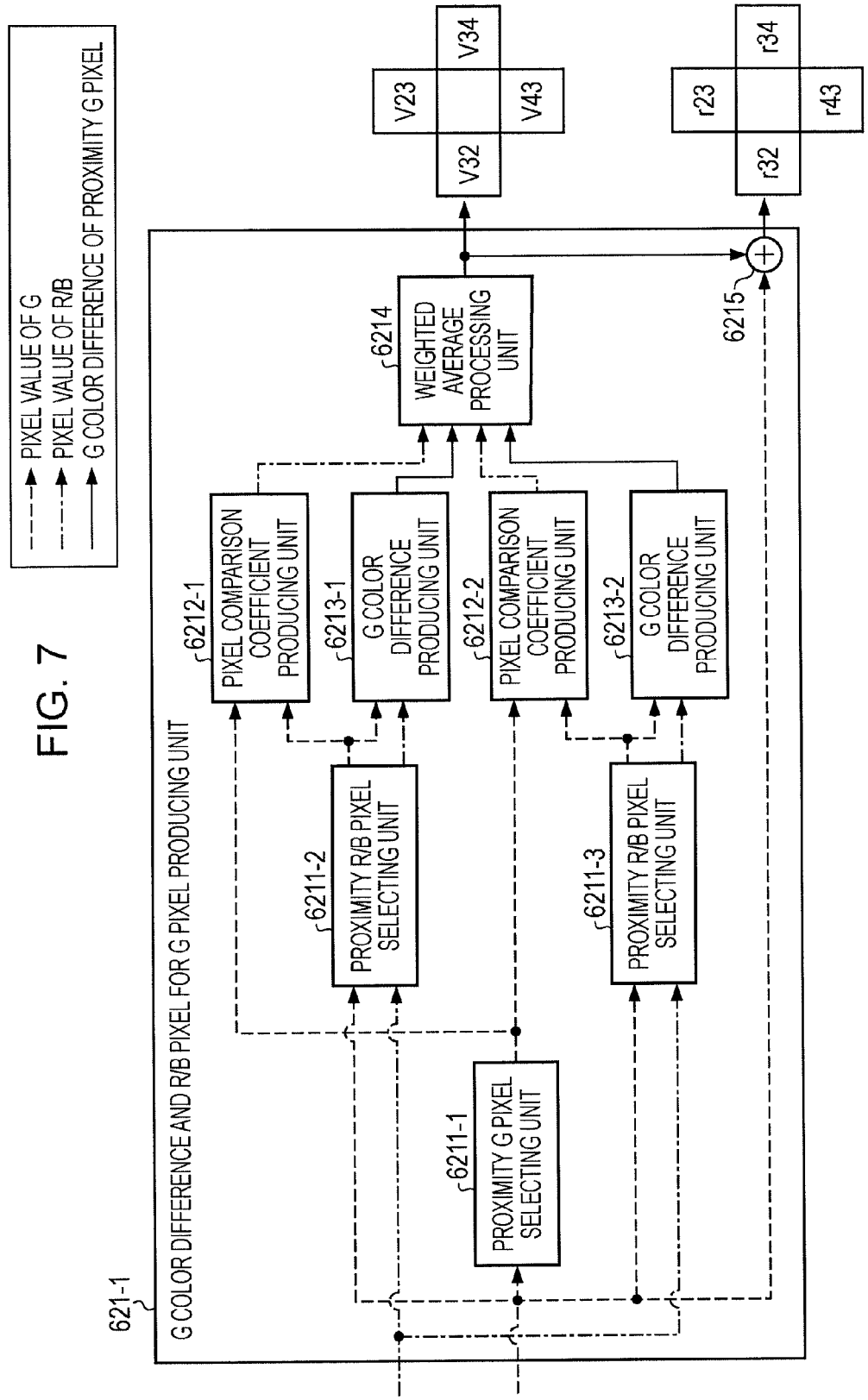
FIG. 7 is a block diagram showing an example of an internal structure of a G color difference and R/B pixel for G pixel producing unit according to the embodiment of the present invention.

Next, a structural example of the proximity G pixel G color difference and R/B pixel producing unit 620 is described with reference to block diagrams of FIGS. 6 and 7. The proximity G pixel G color difference and R/B pixel producing unit 620 shown in FIG. 6 includes G color difference and R/B pixel for G pixel producing units 621-1, 621-2, 621-3, and 621-4 and a delay processing unit 622.

The G color difference and R/B pixel for G pixel producing units 621-1 to 621-4 produce a G color difference for a proximity G pixel positioned in proximity to the pixel of interest, and also produce a pixel value of an R/B pixel for the proximity G pixel. To the G color difference and R/B pixel for G pixel producing units 621-1 to 621-4, a pixel value of the proximity G pixel of the pixel of interest and a pixel value of an R/B pixel positioned in proximity to the proximity G pixel are inputted.

The delay processing unit 622 delays an inputted pixel value of R or B by an amount of processing time of the G color difference and R/B pixel for G pixel producing unit 621 and supplies the delayed pixel value of R or B to the G color difference re-constitution processing unit 630 (refer to FIG. 4).

Next, the more detailed structure of the G color difference and R/B pixel for G pixel producing units 621-1 to 621-4 is described with reference to FIG. 7. Since the G color difference and R/B pixel for G pixel producing units 621-1 to 621-4 have the same structures as each other, the structure of the G color difference and R/B pixel for G pixel producing unit 621-1 is described with reference to FIG. 7 as an example.

The G color difference and R/B pixel for G pixel producing unit 621-1 includes a proximity G pixel selecting unit 6211-1, a proximity R/B pixel selecting unit 6211-2, and a proximity R/B pixel selecting unit 6211-3. The G color difference and R/B pixel for G pixel producing unit 621-1 further includes pixel comparison coefficient producing units 6212-1 and 6212-2, G color difference producing units 6213-1 and 6213-2, a weighted average processing unit 6214, and an adder 6215.

The proximity G pixel selecting unit 6211-1 selects one proximity G pixel positioned in proximity to the pixel of interest among G pixels inputted from the preprocessing unit 610 (refer to FIG. 4) and supplies the selected G pixel to the pixel comparison coefficient producing units 6212-1 and 6212-2.

For example, when each pixel shown in FIG. 5C is inputted, the proximity G pixel selecting unit 6211-1 selects Gr32. Other proximity G pixels Gr34, Gb23, and Gb43 are respectively selected by proximity G pixel selecting units (not shown) inside the G color difference and R/B pixel for G pixel producing units 621-2 to 621-4 (refer to FIG. 6).

The proximity R/B pixel selecting units 6211-2 and 6211-3 select one R/B pixel in proximity to the proximity G pixel selected by the proximity G pixel selecting unit 6211-1 among inputted R/B pixels. Then, the proximity R/B pixel selecting units 6211-2 and 6211-3 supply the selected R/B pixel to the G color difference producing units 6213-1 and 6213-2 respectively. Further, a G interpolation value on a position of the selected R/B pixel is also inputted into the proximity R/B pixel selecting units 6211-2 and 6211-3. Subsequently, the proximity R/B pixel selecting unit 6211-2 supplies the inputted G interpolation value to the pixel comparison coefficient producing unit 6212-1 and the G color difference producing unit 6213-1, and the proximity R/B pixel selecting unit 6211-3 supplies the inputted G interpolation value to the pixel comparison coefficient producing unit 6212-2 and the G color difference producing unit 6213-2.

For example, when the proximity R/B pixel selecting unit 6211-2 selects R31, the proximity R/B pixel selecting unit 6211-2 supplies R31 to the G color difference producing unit 6213-1. Further, the proximity R/B pixel selecting unit 6211-2 supplies a G interpolation value g31 on a position of R31 to the pixel comparison coefficient producing unit 6212-1 and the G color difference producing unit 6213-1.

At this time, another R/B pixel positioned in proximity to the G pixel Gr32 which is selected at the proximity G pixel selecting unit 6211-1, namely R33 (the pixel of interest) is selected at the proximity R/B pixel selecting unit 6211-3 and supplied to the G color difference producing unit 6213-2. At the same time, the proximity R/B pixel selecting unit 6211-3 supplies a G interpolation value g33 on a position of R33 to the pixel comparison coefficient producing unit 6212-2 and the G color difference producing unit 6213-2.

The pixel comparison coefficient producing units 6212-1 and 6212-2 produce a weighting coefficient which is to be used at the weighted average processing unit 6214 and supply the calculated weighting coefficient to the weighted average processing unit 6214. The weighting coefficient is calculated by using the following expression, for example. The following expression represents an example of a case where Gr32 is inputted as a G pixel value and g31 is inputted as a G interpolation value.
Weighting Coefficient $$\alpha 31 = 1/(|g31 - Gr32| + 1)$$

That is, a weighting coefficient which increases as a difference between a g interpolation value and a pixel value of G decreases is calculated. Here, "1" is added to an absolute difference so as to avoid a division by 0 when the difference is 0.

Here, a calculating method of a weighting coefficient is not limited to the above method. Further, though the weighting coefficient is calculated at each time in the embodiment, a look up table (LUT) or the like may be preset so as to select a weighting coefficient from the table. In this case as well, the weighting coefficient is set to increase as a difference between a g interpolation value and a pixel value of G decreases. Alternatively, when all differences are large, a G color difference may be an average value obtained by simply averaging obtained differences.

Further, in a case where a color filter having an array other than the Bayer array is used as the color filter 2, a distance between a G pixel selected at the proximity G pixel selecting unit 6211-1 (or 6211-2) and (a G interpolation value of) one R/B pixel positioned in proximity to the G pixel and a distance between the G pixel and another R/B pixel positioned in proximity to the G pixel may not be equal. In this case, a weighting coefficient may be calculated in consideration of the distance so as to further weight a g interpolation value of the R/B pixel closer to the G pixel. A weighting coefficient in this case is calculated by using the following expression, for example. In the following expression, "dist(A,B)" denotes a distance between A and B.

$$\alpha 31 = 1/(\text{dist}(g31, Gr32) * |g31 - Gr32| + 1)$$

The G color difference producing units 6213-1 and 6213-2 produce a G color difference on a position of a pixel value of R by using a pixel value of R and a G interpolation value on a position of the pixel value of R supplied from the proximity R/B pixel selecting unit 6211-2 and the proximity R/B pixel selecting unit 6211-3. Then, the G color difference producing units 6213-1 and 6213-2 supply the produced G color difference to the weighted average processing unit 6214. The following expression represents a calculation of a G color difference in a case where R31 is inputted as a pixel value of R and g31 is inputted as a G interpolation value.
G Color Difference $$V31 = R31 - g31$$

The weighted average processing unit 6214 produces a G color difference on a position of a proximity G pixel. That is, the weighted average processing unit 6214 produces a G color difference on a position of a proximity G pixel by using a weighting coefficient α outputted from the pixel comparison coefficient producing units 6212-1 and 6212-2 and a G color difference V outputted from the G color difference producing units 6213-1 and 6213-2.

In the production of a G color difference on the position of the proximity G pixel, a G color difference is calculated by using the following expression, for example. The following expression represents a case where a weighting coefficient α31 is inputted from the pixel comparison coefficient producing unit 6212-1, a weighting coefficient α33 is inputted from the pixel comparison coefficient producing unit 6212-2, a G color difference V31 is inputted from the G color difference producing unit 6213-1, and a G color difference V33 is inputted from the G color difference producing unit 6213-2.
G Color Difference of Proximity Gr32

$$V32 = \frac{\alpha 31 * V31 + \alpha 33 * V33}{\alpha 31 + \alpha 33}$$

V34, V23, and V43 respectively on positions of other proximity G pixels Gr34, Gb23, and Gb43 are produced by weighted average processing units (not shown) inside the G color difference and R/B pixel for G pixel producing units 621-2 to 621-4.

The adder 6215 adds each pixel value of the proximity G pixel inputted from the preprocessing unit 610 (refer to FIG. 4) to the G color difference on the position of the proximity G pixel inputted from the weighted average processing unit 6214 so as to produce an R/B pixel on the position of the proximity G pixel. For example, when Gr32 is inputted as a pixel value of the proximity G pixel and V32 is inputted as a G color difference of Gr32, the adder 6215 adds Gr32 to V32 and outputs the added result.

Consequently, an R/B pixel r32 on the position of the proximity G pixel is produced. In a similar manner, r34 on a position of Gr34, r23 on a position of Gb23, and r43 on a position of Gb43 are respectively produced by adders (not shown) inside the G color difference and R/B pixel for G pixel producing units 621-2 to 621-4.

Figure 8:
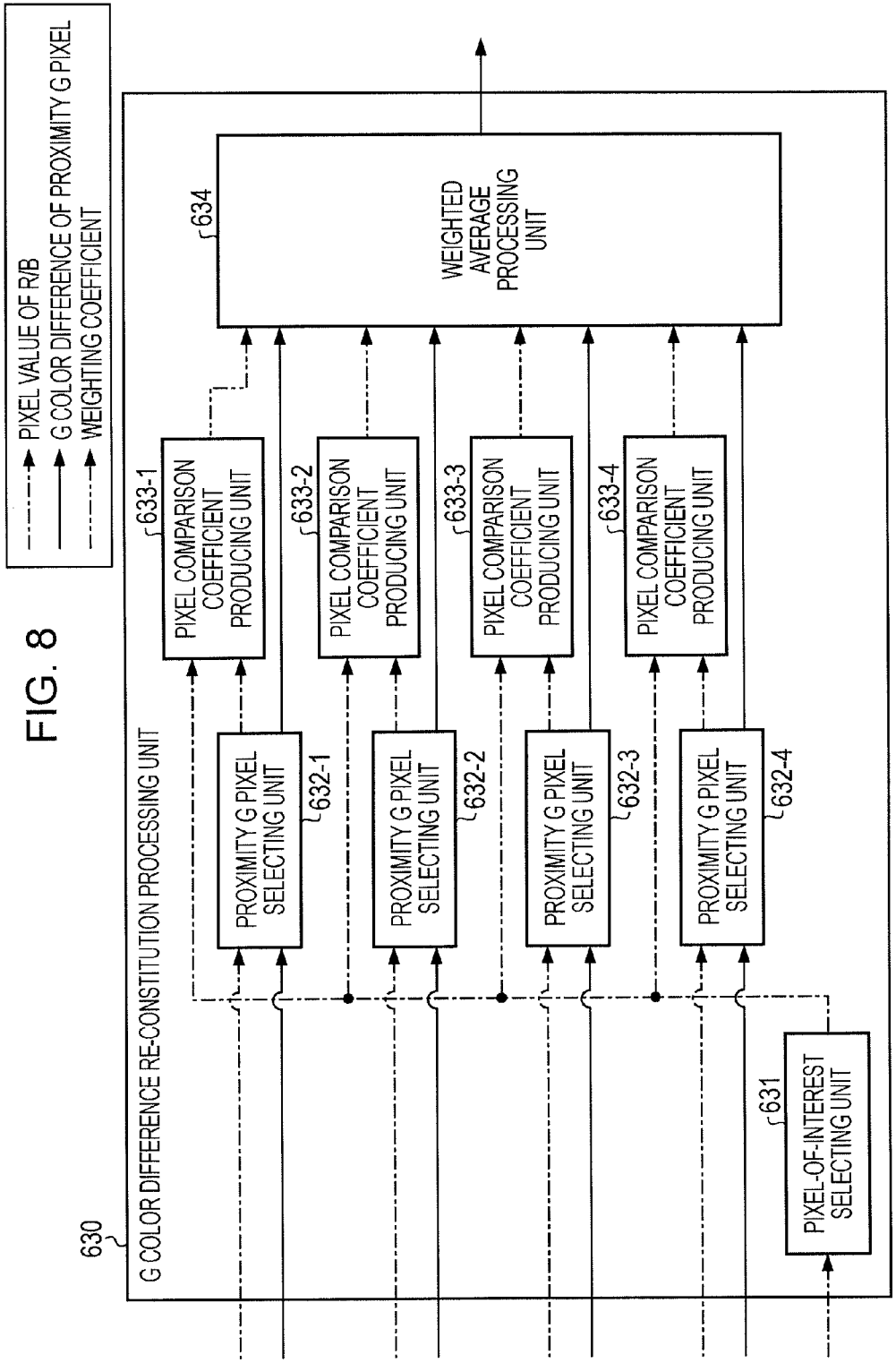
FIG. 8 is a block diagram showing an example of an internal structure of a G color difference re-constitution processing unit according to the embodiment of the present invention.

Next, the G color difference re-constitution processing unit 630 shown in FIG. 4 is described in detail with reference to a block diagram of FIG. 8. The G color difference re-constitution processing unit 630 includes a pixel-of-interest selecting unit 631, proximity G pixel selecting units 632-1 to 632-4, pixel comparison coefficient producing units 633-1 to 633-4, and a weighted average processing unit 634.

The pixel-of-interest selecting unit 631 supplies a pixel value of a pixel of interest inputted from the delay processing unit 622 (refer to FIG. 6) of the proximity G pixel G color difference and R/B pixel producing unit 620 to the pixel comparison coefficient producing units 633-1 to 633-4. For example, when a pixel value R33 of the pixel of interest is inputted, the pixel-of-interest selecting unit 631 supplies R33 to the pixel comparison coefficient producing units 633-1 to 633-4.

The proximity G pixel selecting units 632-1 to 632-4 select one proximity G pixel among proximity G pixels of the pixel of interest. Then the proximity G pixel selecting units 632-1 to 632-4 supply a pixel value r (or b) of R/B produced on a position of the selected proximity G pixel to the pixel comparison coefficient producing units 633-1 to 633-4. Further, the proximity G pixel selecting units 632-1 to 632-4 supply a G color difference V produced on the position of the proximity G pixel to the weighted average processing unit 634.

A pixel value r/b of R/B produced on the proximity G pixel is supplied from adders inside the G color difference and R/B pixel for G pixel producing units 621-1 to 621-4. Further, a G color difference V produced on the proximity G pixel is supplied from the weighted average processing units inside the G color difference and R/B pixel for G pixel producing units 621-1 to 621-4.

For example, when the proximity G pixel selecting unit 632-1 selects Gr32 as a proximity G pixel, a pixel value r32 of R produced on a position of Gr32 is supplied to the pixel comparison coefficient producing unit 633-1. Then a G color difference V32 produced on the position of Gr32 is supplied to the weighted average processing unit 634.

The pixel comparison coefficient producing units 633-1 to 633-4 calculate a weighting coefficient by using a pixel value of the pixel of interest supplied from the pixel-of-interest selecting unit 631 and a G color difference V supplied from the proximity G pixel selecting units 632-1 to 632-4.

For example, the pixel comparison coefficient producing unit 633-1 produces a weighting coefficient α32 by using a pixel value R33 of the pixel of interest supplied from the pixel-of-interest selecting unit 631 and a pixel value r32 of R supplied from the proximity G pixel selecting unit 632-1. The weighting coefficient α32 is calculated by the following expression or the like.
Weighting Coefficient $$\alpha 32 = 1/(|r32 - R33| + 1)$$

In a similar manner, a weighting coefficient α34, a weighting coefficient α23, and a weighting coefficient α43 are respectively produced at the pixel comparison coefficient producing units 633-2, 633-3, and 633-4 and supplied to the weighted average processing unit 634.

The weighted average processing unit 634 re-constitutes a G color difference of the pixel of interest by using the weighting coefficients α outputted from the pixel comparison coefficient producing units 633-1 to 633-4 and G color differences V outputted from the proximity G pixel selecting units 632-1 to 632-4.

In the production of a G color difference on the position of the pixel of interest, a G color difference is calculated by using the following expression. The following expression represents a case of the following inputs.
Weighting coefficients α32, α34, α23, and α43
G color differences V32, V34, V23, and V43
G Color Difference of the Pixel of Interest R33

$$V'33 = \frac{\alpha 32 * V32 + \alpha 34 * V34 + \alpha 23 * V23 + \alpha 43 * V43}{\alpha 32 + \alpha 34 + \alpha 23 + \alpha 43}$$

Here, the calculation method of the G color difference V'33 is not limited to this method. For example, the G color difference V'33 may be obtained by calculating an average between a G color difference calculated by using G color differences of pixels adjacent to the pixel of interest in the horizontal direction and a G color difference calculated by using G color differences of pixels adjacent to the pixel of interest in the vertical direction. In the following expressions, V33$_h$ denotes a G color difference calculated by using G color differences of pixels adjacent to the pixel of interest in the horizontal direction, and V33$_v$ denotes a G color difference calculated by using G color differences of pixels adjacent to the pixel of interest in the vertical direction.

$$V33_h = \frac{a32 * V32 + a34 * V34}{a32 + a34}$$

$$V33_v = \frac{a23 * V23 + a43 * V43}{a23 + a43}$$

$$V33' = \frac{V33_h + V33_v}{2}$$

The G color difference V'33 may be calculated by using other expression, or various weighting coefficients may be preset in a LUT or the like so as to select an appropriate weighting coefficient from the LUT or the like.

4. Operation Example of G Color Difference Re-Constituting Unit

Figure 9:
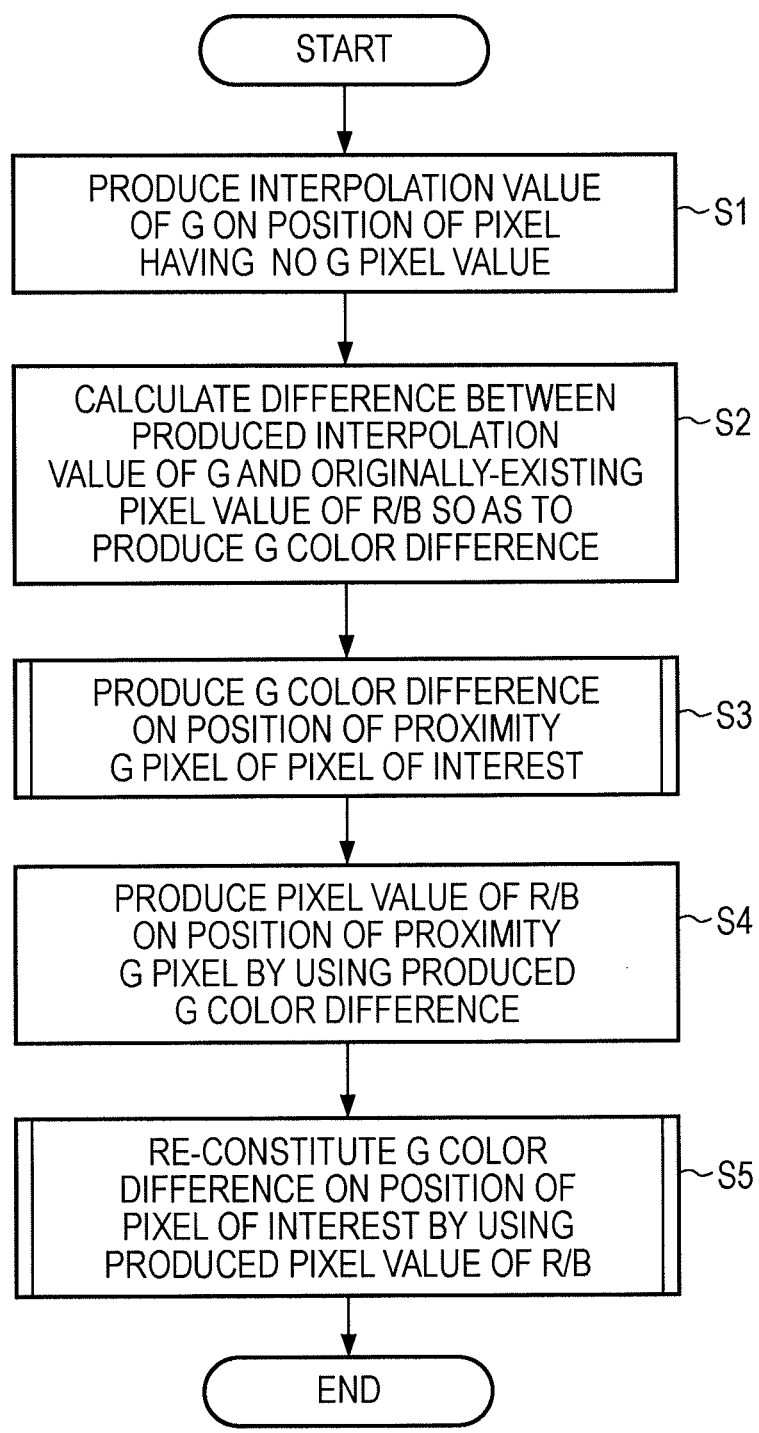
FIG. 9 is a flowchart showing an example of processing of the G color difference re-constituting unit according to the embodiment of the present invention.
Figure 10:
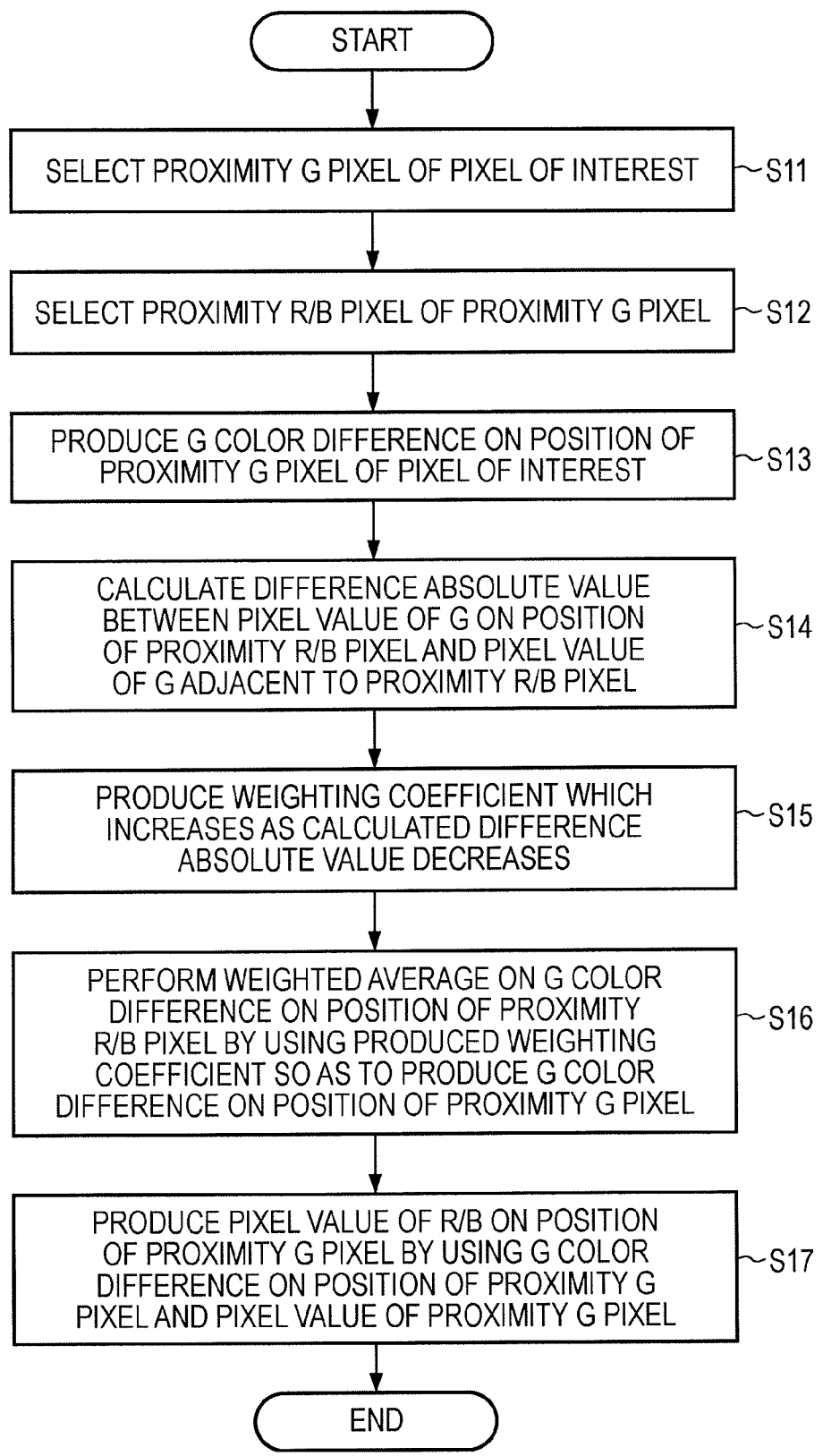
FIG. 10 is a flowchart showing an example of processing of the proximity G pixel G color difference and R/B pixel producing unit according to the embodiment of the present invention.

An operation example of the G color difference re-constituting unit 600 composed of the blocks described above will now be described with reference to flowcharts of FIGS. 9 to 11. In FIG. 9, an interpolation value g of G on a position of an R/B pixel having no G pixel value is first produced by the preprocessing unit 610 (refer to FIG. 4) (step S1).

Subsequently, a difference between the interpolation value g of G produced by the preprocessing unit 610 and an originally-existing pixel value of R/B is calculated by the proximity G pixel G color difference and R/B pixel producing unit 620 (refer to FIGS. 6 and 7) so as to produce a G color difference U or V on a position of the R/B pixel (step S2). Further, a G color difference U/V on a position of a proximity G pixel is produced also by the proximity G pixel G color difference and R/B pixel producing unit 620 by using the G color difference U/V on the position of the R/B pixel, the interpolation value g of G outputted from the preprocessing unit 610, and a pixel value of the proximity G pixel (step S3).

Next, a pixel value r/b on a position of the proximity G pixel is produced also by the proximity G pixel G color difference and R/B pixel producing unit 620 by using the G color difference U/V on the position of the proximity G pixel and a pixel value Gr or Gb of the proximity G pixel (step S4).

Then, a G color difference U'/V' on the pixel of interest is re-constituted by the G color difference re-constitution processing unit 630 (refer to FIG. 8) by using the pixel value r/b of the pixel of R/B on the position of the proximity G pixel and a pixel value R/B of the pixel of interest (step S5).

The processing at the proximity G pixel G color difference and R/B pixel producing unit 620 shown in step S3 of FIG. 9 is now be described in detail with reference to the flowchart of FIG. 10. Each processing shown in FIG. 10 is performed at each block shown in FIG. 7.

Any one of proximity G pixels of the pixel of interest is selected by the proximity G pixel selecting unit 6211-1 (step S11). Subsequently, an R/B pixel adjacent to the selected G pixel is selected by the proximity R/B pixel selecting units 6211-2 and 6211-3 (step S12).

Next, a G color difference U/V on the position of the proximity G pixel is calculated by the G color difference producing unit 6213 (step S13). Then, a difference absolute value between the G pixel selected at step S11 and the G color difference U/V on the position of the proximity G pixel is calculated by the pixel comparison coefficient producing unit 6212 (step S14).

Subsequently, a weighting coefficient α which increases as the difference absolute value calculated at step S14 decreases by the weighted average processing unit 6214 (step S15). A weighted average of the G color difference U/V produced at the position of the proximity R/B pixel is calculated by using the weighting coefficient α so as to produce a G color difference U/V on the position of the proximity G pixel (step S16).

Further, the G color difference U/V produced on the position of the proximity G pixel is added to the pixel value of the proximity G pixel by the adder 6215 so as to produce a pixel r/b of R/B on the position of the proximity G pixel (step S17).

The processing at the G color difference re-constitution processing unit 630 shown in step S5 of FIG. 9 is now described with reference to the flowchart of FIG. 11. Each processing shown in FIG. 11 is performed at each block shown in FIG. 8.

First, a pixel of interest is selected by the pixel-of-interest selecting unit 631 and a proximity G pixel of the pixel of interest is selected by the proximity G pixel selecting unit 632 (step S21). Subsequently, a difference absolute value between a pixel value of R/B on a position of the proximity G pixel and a pixel value of R/B of the pixel of interest is calculated by the pixel comparison coefficient producing unit 633 (step S22).

Next, a weighting coefficient α which increases as the difference absolute value calculated at step S22 decreases is calculated by the weighted average processing unit 634 (step S23). Then, a weighted average of the G color difference U/V produced on the position of the proximity G pixel is calculated by using the weighting coefficient α so as to re-constitute a G color difference U'/V' on the position of the pixel of interest (step S24).

The G color difference U'/V' produced as this is supplied to the memory unit 601 (refer to FIG. 2) inside the color interpolation processing unit 6 and the above-mentioned processing is performed by the memory unit 601, the G color difference interpolation processing unit 602, and the RGB producing unit 606.

Effect of the Embodiment

According to the embodiment of the present invention, G color differences U/V formed by combining a plurality of G color differences is produced around a pixel of interest, and a G color difference U'/V' on the position of the pixel of interest is re-constituted based on an average value of the G color differences U/V. That is, the G color difference U'/V' of the pixel of interest is re-constituted based on a more reliable G color difference U/V formed by collecting a plurality of G color differences U/V. Accordingly, interpolation accuracy of the pixel of interest can be improved even in such a case that a pixel signal of a processing object constitutes a part of an edge or a corner of an image and accuracy of a G interpolation value produced at the preprocessing unit 610 is poor.

Further, such processing is performed at a previous stage of R, G, B interpolation processing performed by the RGB producing unit 606, so that an amount of data used for the calculation can be reduced. Accordingly, a resource such as a memory used for the processing can be saved as well.

Further, performing such the processing at the previous stage of R, G, B interpolation processing performed by the RGB producing unit 606 enables error correction at the previous stage of the RGB producing unit 606 even when there is an error in the G interpolation performed at the start. Accordingly, a damage of an error occurring in the G interpolation performed at the start can be prevented from spreading.

Further, weighted averaging for enhancing reliability is performed only on pixels (g33, r32, and the like) obtained by estimation, so that pixels (R33, Gr32, Gb43, and the like) originally obtained by the color filter 2 are prevented from deteriorating.

Further, according to the embodiment described above, a pixel value of which an amount of change with respect to the pixel of interest is smaller can be more largely weighted in an interpolation of a G color difference. Therefore, accuracy in the color interpolation can be improved even in dealing in an image in which "constant hue hypothesis" is not strictly accepted.

Further, in this method, the processing can be repeatedly performed at the previous stage of the RGB producing unit 606, being able to further improve image quality.

Modification

The color filter 2 has the Bayer array as shown in FIG. 13 in the embodiment described above, but the color filter 2 is not limited to this. The color filter 2 may be any filter as long as the filter has an array in which pixels of one color are arranged in the larger number than pixels of other two colors.

Figures 12A, 12B, 12C:
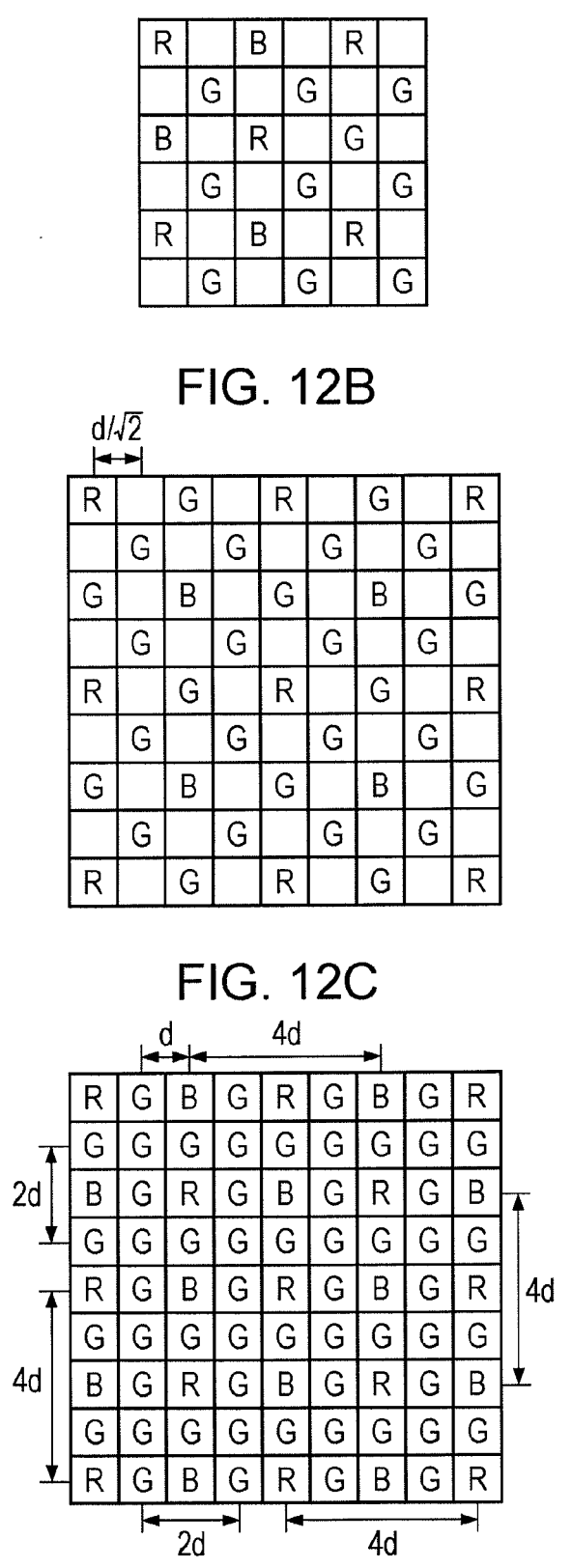

For example, the filter may have a honeycomb array in which pixels are arranged in a honeycomb fashion as shown in FIG. 12A. Alternatively, the filter may have an array used in a ClearVid CMOS Sensor as shown in FIG. 12B. That is, such a filter that three times as large number of G pixels as the number of R/B pixels are arranged so as to surround the R/B pixels is applicable. Alternatively, such a filter that six times as large number of G pixels as the number of R/B pixels are arranged so as to surround the R/B pixels (G pixels are arranged in an interval of 2d and R/B pixels are arranged in an interval of 4d in the horizontal direction and the vertical direction), as shown in FIG. 12C, is applicable.

Further, the G pixel of the pixel of interest is interpolated by using the G color difference V'33 obtained at the G color difference re-constitution processing unit 630 (refer to FIG. 8) and the pixel value of the R/B pixel in the above-mentioned embodiment. However, the order of the processing is not limited to this. For example, an R/B pixel may be corrected in advance by using the G color difference V'33 and the G pixel of the pixel of interest may be interpolated by using the R/B pixel after the correction and the G color difference V'33.

Further, though the embodiment of the present invention is applied to the imaging device as an example, the embodiment is applicable to a device which performs processing on a video signal outputted from an imaging device, and the like, without an imaging element.

The present application contains subject matter related to that disclosed in Japanese Priority Patent Application JP 2009-189419 filed in the Japan Patent Office on Aug. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:
a preprocessing unit configured to interpolate a G color component using (a) a position of a pixel of interest, the pixel of interest having no G color component and having one of an R color component and a B color component and being on a predetermined pixel position in a predetermined array of color filters of primary colors of R, G, and B, and (b) a position of a pixel having a same color component as the pixel of interest, in a pixel signal obtained by an imaging element including a plurality of pixels being two-dimensionally arranged on which the color filters are alternately arranged in the predetermined array, so as to produce a first G interpolation signal, wherein when the pixel of interest has a G color component, no interpolation is performed;

a proximity G pixel G color difference and RIB pixel producing unit configured to (a) produce one of a first R-G color difference signal and a first B-G color difference signal (1) for the position of the pixel of interest and (2) for the position of the pixel having the same color component as the pixel of interest by using the first G interpolation signal, (b) produce one of a second R-G color difference signal and a second B-G color difference signal for a position of a proximity G pixel that is positioned in proximity to the pixel of interest by using one of the first R-G color difference signal and the first B-G color difference signal, and (c) interpolate one of an R color component and a B color component for the position of the proximity G pixel by using one of the second R-G color difference signal and the second B-G color difference signal;

a G color difference re-constitution processing unit configured to re-constitute one of a third R-G color difference signal and a third B-G color difference signal for the position of the pixel of interest by using one of the R component and the B component that are interpolated for the proximity G pixel by the proximity G pixel G color difference and R/B pixel producing unit; and a G color difference interpolation processing unit configured to interpolate one of an R-G color difference signal and a B-G color difference signal to a position of a predetermined pixel by using one of the third R-G color difference signal and the third B-G color difference signal that are re-constituted by the G color difference re-constitution processing unit.

2. The signal processing device according to claim 1, wherein the proximity G pixel G color difference and R/B pixel producing unit includes a first pixel comparison coefficient producing unit configured to calculate a difference between a G component included in the proximity G pixel and the first G interpolation signal produced on the position of the proximity G pixel so as to calculate a first weighting coefficient, a G color difference producing unit configured to produce one of the R-G color difference signal and the B-G color difference signal on the position of the proximity G pixel by using one of an R component and a B component included in one of an R pixel and a B pixel that are positioned in proximity to the proximity G pixel, and the first G interpolation signal produced on the position of the proximity G pixel, a first weighted average processing unit configured to set a value of a weighted average of one of the R-G color difference signal and the B-G color difference signal, the R-G color difference signal and the B-G color difference signal being produced by the G color difference producing unit, on the position of the proximity G pixel to be one of an R-G color difference signal and a B-G color difference signal on the position of the proximity G pixel by using the first weighting coefficient, and an adder configured to add one of the R-G color difference signal and the B-G color difference signal on the position of the proximity G pixel, the R-G color difference signal and the B-G color difference signal being obtained by the first weighted average processing unit, to the G component included in the position of the proximity G pixel.

3. The signal processing device according to claim 2, wherein the G color difference re-constitution processing unit includes a second pixel comparison coefficient producing unit configured to calculate a difference between one of the R component and the B component interpolated by the proximity G pixel G color difference and R/B pixel producing unit and one of the R component and the B component included in the pixel of interest so as to calculate a second weighting coefficient, and a second weighted average processing unit configured to set a value of a weighted average of one of the R-G color difference signal and the B-G color difference signal, the R-G color difference signal and the B-G color difference signal being produced by the proximity G pixel G color difference and R/B pixel producing unit, on the position of the proximity G pixel to be one of an R-G color difference signal and a B-G color difference signal on the position of the pixel of interest by using the second weighting coefficient.

4. The signal processing device according to claim 3, wherein the color filter is a Bayer-array type color filter.

5. The signal processing device according to claim 4, further comprising:

an RGB producing unit configured to produce a pixel signal of the R, a pixel signal of the G, and a pixel signal of the B by using one of a combination of one of the R-G color difference signal and the B-G color difference signal interpolated by the G color difference interpolation processing unit and one of the third R-G color difference signal and the third B-G color difference signal, and a combination of one of the R-G color difference signal and the B-G color difference signal interpolated by the G color difference interpolation processing unit and one of the G color component included in the G pixel, the R color component included in the R pixel, and the B color component included in the B pixel.

6. An imaging device comprising:

an imaging element having a plurality of pixels, the pixels being two-dimensionally arranged, on which color filters of primary colors of R, G, and B are alternately arranged in a predetermined array, and photoelectrically converting imaging light incident through the color filters so as to obtain a pixel signal;

a preprocessing unit configured to interpolate a G color component using (a) a position of a pixel of interest, the pixel of interest having no G color component and having one of an R color component and a B color component and being on a predetermined pixel position in the array, and (b) a position of a pixel having a same color component as the pixel of interest, in the pixel signal obtained by the imaging element, so as to produce a first G interpolation signal, wherein when the pixel of interest has a G color component, no interpolation is performed;

a proximity G pixel G color difference and RIB pixel producing unit configured to (a) produce one of a first R-G color difference signal and a first B-G color difference signal (1) for the position of the pixel of interest and (2) for the position of the pixel having the same color component as the pixel of interest by using the first G interpolation signal, (b) produce one of a second R-G color difference signal and a second B-G color difference signal for a position of a proximity G pixel that is positioned in proximity to the pixel of interest by using one of the first R-G color difference signal and the first B-G color difference signal, and (c) interpolate one of an R color component and a B color component for the position of the proximity G pixel by using one of the second R-G color difference signal and the second B-G color difference signal;

a G color difference re-constitution processing unit configured to re-constitute one of a third R-G color difference signal and a third B-G color difference signal for the position of the pixel of interest by using one of the R component and the B component that are interpolated for the proximity G pixel by the proximity G pixel G color difference and R/B pixel producing unit; and a G color difference interpolation processing unit configured to interpolate one of an R-G color difference signal and a B-G color difference signal to a position of a predetermined pixel by using one of the third R-G color difference signal and the third B-G color difference signal that are re-constituted by the G color difference re-constitution processing unit.

7. A signal processing method comprising the steps of:

interpolating a G color component using (a) a position of a pixel of interest, the pixel of interest having no G color component and having one of an R color component and a B color component and being on a predetermined pixel position in a predetermined array of color filters of primary colors of R, G, and B, and (b) a position of a pixel having a same color component as the pixel of interest, in a pixel signal obtained by an imaging element including a plurality of pixels being two-dimensionally arranged on which the color filters are alternately arranged in the predetermined array, so as to produce a first G interpolation signal, wherein when the pixel of interest has a G color component, no interpolation is performed;

producing one of a first R-G color difference signal and a first B-G color difference signal (1) for the position of the pixel of interest and (2) for the position of the pixel having the same color component as the pixel of interest by using the first G interpolation signal;

producing one of a second R-G color difference signal and a second B-G color difference signal for a position of a proximity G pixel that is positioned in proximity to the pixel of interest by using one of the first R-G color difference signal and the first B-G color difference signal;

interpolating one of an R color component and a B color component for the position of the proximity G pixel by using one of the second R-G color difference signal and the second B-G color difference signal;

re-constituting one of a third R-G color difference signal and a third B-G color difference signal for the position of the pixel of interest by using one of the R component and the B component that are interpolated for the proximity G pixel; and interpolating one of an R-G color difference signal and a B-G color difference signal to a position of a predetermined pixel by using one of the third R-G color difference signal and the third B-G color difference signal that are re-constituted.

* * * * *